Patented May 24, 1932

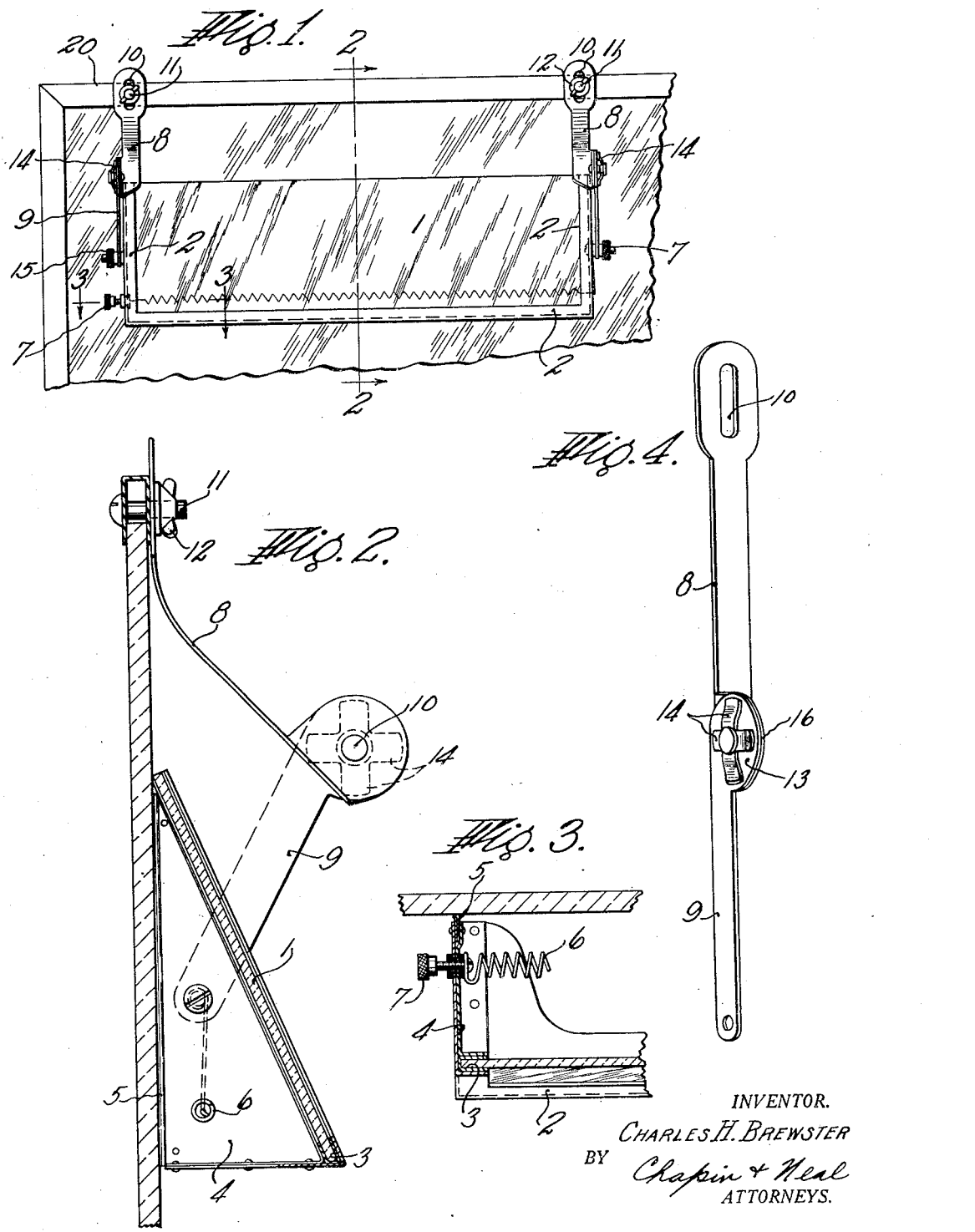

1,860,073

UNITED STATES PATENT OFFICE

CHARLES H. BREWSTER, OF MIDDLETOWN, CONNECTICUT

WINDSHIELD WARMER

Application filed July 18, 1930. Serial No. 468,858.

This invention relates to an improved combination of a windshield and a readily movable and adjustable device to assure clear vision. Such a device is useful when designed to stop freezing on the windshield. I have shown a specific form for this purpose. But my invention can also be applied to a device to cut down headlight glare. Both of these purposes can be embodied in the same device as I will point out in reference to the form illustrated in the drawings.

In the use of such a device, whether for one purpose or the other, or both, the need is of course intermittent. For the most part, the device is out of use. When needed it may be only for a short time after which it is desirable to get it out of the way. When the device is made as a heater to stop freezing, the ready placing of such a device into and out of position on the windshield, during road use, presents a problem. I have shown a windshield heating device which functions best when adjusted to press tightly against the windshield.

According to one feature of my invention the structural elements are combined to hold the heating device tightly against the windshield in an improved manner. According to another feature the combination is formed to place the device (whether for heating, anti-glare purposes, or both) in working position on the windshield and move it out of such position with improved structure and convenience.

These and other features of the invention will appear in the following detailed description and in the annexed claims.

Referring to the drawings:—

Fig. 1 shows the combination of the windshield and one form of my device in working position. This view is from the driver's side of the windshield;

Fig. 2 is a section on line 2—2 of Fig. 1;

Fig. 3 is a detail section on line 3—3 of Fig. 1; and

Fig. 4 is a view of the hanger or supporting means.

The sheet of glass 1 is held in the metal frame 2 with suitable packing 3. Triangular plates 4 extend backwardly from the frame 2 at opposite ends. They position glass 1 to slope outwardly and downwardly from the windshield. The plates 4 have a packing 5 of canvas to give a soft and tight contact against the windshield. The space formed by the windshield, glass 1, and side plates 4, as shown, is closed except at the bottom. The electric resistance or heating wire 6 extends across this space near the bottom (and as nearly out of line with the vision as practical.) It is connected to a suitable circuit by binding posts 7. This kind of supplemental window device on the windshield to stop freezing is shown and claimed in my copending application Ser. No. 439,-814, filed March 28, 1930. And for such purpose no more need be said about the device in this application except that glass 1 may be colored for the anti-glare purpose.

With the device of the kind shown I provide hanger, presser, supporting or adjustable means such as illustrated in Figs. 1, 2, and 3. This means is made in two parts 8 and 9 hinged together at 10 by a friction arrangement. At least one of these parts is made of spring metal. I have shown them both made of flat spring metal strips. Part 8 has a slot at one end to position the hanger against the frame of the windshield 20 so as to be adjustably held by a bolt 11 with a thumb nut 12. At the other end strip 8 has an integral flange 16 mating with a flange 13 at the adjacent end of strip 9. These strips 8 and 9 are arranged to lie in planes at right angles to each other. The flange 16 is bent up from part 8 to mate with 13 on part 9 for the friction hinge. Where both parts 8 and 9 are of spring metal one can function as a flat spring while the other functions as a stiff arm because of its right angle relation to the other.

The flanges 16 and 13 are frictionally held together by a spring spider 14 secured to and pressed against flange 13 by a rivet passing through the coinciding centers of parts 14, 13, and 16. The friction hinge made under this arrangement should be such that parts 8 and 9 can be readily turned by hand but not by the weight of the device, even under the jarring movements of an automobile. In other words, I make the friction hinge with sufficient resistance to turning that when once adjusted by hand it will not turn accidentally in the normal use of the combination of parts.

As shown in Fig. 1, I mount two of these hangers from the upper end of the windshield frame and fasten the parts 9 to the spaced triangular frame members 4, one at binding post 7 (the ground for the circuit through the heater) and the other at post 15. At these posts the attachment is made by knurled thumb nuts. The improved arrangement of parts can now be understood from Fig. 2.

The spring parts 8 can be bent upwardly to put them under desired tension. The heating device can be turned to position against the windshield. All that is necessary is to raise the device vertically on the windshield. All the spring tension of arms 8 is then applied automatically through the stiff arms 9 to press the upper and two side edges of the heater tightly and snugly against the windshield. The friction hinges resist movement sufficiently to prevent any release of the spring tension provided by parts 8. Thus, there is a constant and sufficient spring pressure of the heating device against the windshield. The slots 10 in strips 8 permit adjustment for the right vertical position of the heater device under the right tension.

Once adjusted the device stays in place. But if the heating device is no longer needed, it may be swung upwardly by hand around hinge 10 and into elevated position, where it is out of the line of normal vision through the windshield. The speed and convenience with which the device can be put in position to function and be laid back out of the way is of large importance in a device of this kind.

In some types of windshield it will be desirable to have parts 8 fastened to the body instead of the frame of the windshield.

The slots 10 in parts 8 permit a vertical adjustment of the windshield without materially affecting the degree of spring pressure of the parts. The combination is applied to the windshield so that the spring tension of parts 8 is sufficient for my purpose and then adjusted for vertical height. When this is once done all the operator needs to do is to swing the device into and out of position by hand according to his needs. It will be quite obvious to skilled mechanics how the essential features of my invention may be embodied in other specific forms.

I claim as my invention:

1. A bracket structure for supporting a clear vision device in position against a windshield or the like comprising a hanger of two parts connected by a friction hinge, at least one of said parts being sufficiently resilient to provide spring tension tending to press the device against the windshield, and the hinge being sufficiently friction-tight to resist turning under the force of said spring tension to adjust the spring pressure of said device against the windshield.

2. A bracket structure for supporting a clear vision device in position against a windshield or the like comprising hangers adapted to be positioned one at each side of said device, their lower ends being formed for connection to said device and their upper ends being formed for connection to the windshield frame, said hangers each made up of two flat metal strips, one of spring metal positioned flatwise with respect to the windshield, the other positioned edgewise and connected together by a frictional hinge, said flatwise metal strip being under spring tension tending to press the device against the windshield, and the hinge being sufficiently friction-tight to resist turning under the force of said spring tension but adapted to be turned by hand to adjust the spring pressure of said device against the windshield.

3. A bracket structure for supporting a clear vision device in position against a windshield or the like comprising hangers adapted to be positioned one at each side of said device and pivotally connected at their lower ends to said device and to be anchored at their upper ends by an adjustable slotted fastening to the windshield frame, said hangers each made up of two flat metal strips, one of spring metal positioned flatwise with respect to the windshield, the other positioned edgewise and connected together by a friction hinge, said flatwise metal strip being under spring tension tending to press the device against the windshield, and the hinge being sufficiently friction-tight to resist turning under the force of said spring tension but adapted to be turned by hand to adjust the spring pressure of said device against the windshield.

4. A bracket structure for supporting a clear vision device in position against a windshield or the like comprising a spring bracket on which the device may be turned to hold it in or out of pressure position on the windshield, said bracket including means by which the degree of spring pressure may be changed when the device is moved vertically on the windshield.

5. A bracket structure for supporting a clear vision device in position against a windshield or the like, comprising a hinged bracket, one member of which is adapted to be pivotally connected to said device and the other member adapted to be anchored to the windshield frame, at least one of said members being resilient in the direction of the windshield, and means normally holding said hinge against pivotal movement.

In testimony whereof I have affixed my signature.

CHARLES H. BREWSTER.